United States Patent
Kim et al.

(10) Patent No.: US 12,487,196 B2
(45) Date of Patent: Dec. 2, 2025

(54) AUTOMATED MAPPING METHOD OF CRYSTALLINE STRUCTURE AND ORIENTATION OF POLYCRYSTALLINE MATERIAL WITH DEEP LEARNING

(71) Applicants: Samsung Electronics Co., Ltd., Suwon-si (KR); RESEARCH & BUSINESS FOUNDATION SUNGKYUNKWAN UNIVERSITY, Gyeonggi-do (KR)

(72) Inventors: Young-Min Kim, Seongnam-si (KR); Eunha Lee, Seoul (KR); Myoungho Jeong, Seoul (KR); Young-Hoon Kim, Suwon-si (KR); Sang-Hyeok Yang, Jeju (KR)

(73) Assignees: Samsung Electronics Co., Ltd., Gyeonggi-do (KR); RESEARCH & BUSINESS FOUNDATION SUNGKYUNKWAN UNIVERSITY, Gyeonggi-do (KR)

(*) Notice: Subject to any disclaimer, the term of this patent is extended or adjusted under 35 U.S.C. 154(b) by 445 days.

(21) Appl. No.: 17/959,793

(22) Filed: Oct. 4, 2022

(65) Prior Publication Data
US 2023/0122101 A1    Apr. 20, 2023

(30) Foreign Application Priority Data

Oct. 15, 2021  (KR) .................. 10-2021-0137637
May 17, 2022  (KR) .................. 10-2022-0060095

(51) Int. Cl.
*G01N 23/20058*   (2018.01)
*G06T 7/70*         (2017.01)
(Continued)

(52) U.S. Cl.
CPC ........ *G01N 23/20058* (2013.01); *G06T 7/70* (2017.01); *G06V 10/763* (2022.01);
(Continued)

(58) Field of Classification Search
None
See application file for complete search history.

(56) References Cited

U.S. PATENT DOCUMENTS 10,361,061 B2   7/2019  Kondo et al.
10,727,025 B2   7/2020  Shim et al.
(Continued)

OTHER PUBLICATIONS

Yuan et al., Training artificial neural networks for precision orientation and strain, mapping using 4D electron diffraction datasets, Ultramicroscopy vol. 231, 113256 (Mar. 11, 2021) (Year: 2021).*
(Continued)

*Primary Examiner* — James Choi
(74) *Attorney, Agent, or Firm* — Harness, Dickey & Pierce, P.L.C.

(57) ABSTRACT

A method for two-dimensional mapping of crystal information of a polycrystalline material may include acquiring a diffraction pattern acquired by scanning an electron beam to a polycrystalline material, generating a plurality of clusters by applying a clustering algorithm to the acquired diffraction pattern based on unsupervised learning, acquiring crystal information of the polycrystalline material by applying a parallel deep convolutional neural network (DCNN) algorithm to each of the plurality of generated clusters based on supervised learning, and generating a two-dimensional image in which the acquired crystal information is mapped.

20 Claims, 11 Drawing Sheets

(51) Int. Cl.
*G06V 10/762* (2022.01)
*G06V 10/764* (2022.01)
*G06V 10/82* (2022.01)

(52) U.S. Cl.
CPC ............ *G06V 10/764* (2022.01); *G06V 10/82* (2022.01); *G06T 2207/10061* (2013.01); *G06T 2207/20084* (2013.01)

(56) References Cited

U.S. PATENT DOCUMENTS

| | | | |
|---|---|---|---|
| 2011/0161361 | A1 | 6/2011 | Csanyi et al. |
| 2017/0011518 | A1 | 1/2017 | Langlois |
| 2019/0171908 | A1 | 6/2019 | Salavon |
| 2020/0335301 | A1 | 10/2020 | Bammes et al. |

OTHER PUBLICATIONS

Martineau et al., Unsupervised machine learning applied to scanning precession electron diffraction data, Adv Struct Chem Imag 5: 3 (Mar. 15, 2019) (Year: 2019).*

Mitchell et al., DiffTools: Electron diffraction software tools for Digital Micrograph™, 71:8 Microscopy Research and Technique 559 (Jul. 24, 2008) (Year: 2008).*

Zhou et al. A mean shift based fuzzy c-means algorithm for image segmentation, 30th Annual International IEEE Embs Conference, 3091 (Aug. 20-24, 2008) (Year: 2008).*

Xu et al., A deep convolutional neural network to analyze position averaged convergent beam electron diffraction patterns, 188 Ultramicroscopy 59 (2018) (Year: 2018).*

Kaufmann et al., Crystal symmetry determination in electron diffraction using machine learning, Science 367, 564-568 (2020) (Year: 2020).*

M. H. Park et al., "A comprehensive study on the structural evolution of HfO2 thin films doped with various dopants," Journal of Materials Chemistry C, 5, pp. 4677-4690, Apr. 19, 2017.

M P Oxley et al., "Deep learning of interface structures from simulated 4D STEM data: cation intermixing vs. roughening," Machine Learning: Science and Technology, vol. 1, Oct. 29, 2020.

W. Xu et al., "A deep convolutional neural network to Analyze Position Averaged Convergent Beam Electron Diffraction Patterns," arXiv:1708.00855v1, Aug. 3, 2017.

J. A. Aguiar et al., "Decoding crystallography from high-resolution electron imaging and diffraction datasets with deep learning," Science. Advances, Oct. 30, 2019.

Jeffrey M. Ede et al, "Deep learning in electron microscopy" arXiv:2009.08328v7, Mar. 8, 2021.

Jiwon Jeong et al, "Crystallographic Orientation Analysis of Nanocrystalline Tungsten Thin Film Using TEM Precession Electron Diffraction and SEM Transmission Kikuchi Diffraction," Microscopy and Microanalysis (2021), 27, 237-249, May 26, 2021.

Kevin Kaufmann et al, "Crystal symmetry determination in electron diffraction using machine learning," Science 367, 564-568, Jan. 31, 2020.

* cited by examiner

AUTOMATED MAPPING METHOD OF CRYSTALLINE STRUCTURE AND ORIENTATION OF POLYCRYSTALLINE MATERIAL WITH DEEP LEARNING

CROSS-REFERENCE TO RELATED APPLICATIONS

This application is based on and claims priority under 35 U.S.C. § 119 to Korean Patent Application Nos. 10-2021-0137637, filed on Oct. 15, 2021, and 10-2022-0060095, filed on May 17, 2022, in the Korean Intellectual Property Office, the disclosures of which are incorporated by reference herein in their entireties.

BACKGROUND

1. Field

The disclosure relates to an apparatus and method of automatically mapping crystal structure information of a thin film of a polycrystalline material acquired using an electron microscope to generate a two-dimensional image.

2. Description of the Related Art

In studying a material, it is often beneficial to visualize the crystal structure information of a sample through an electron microscope. For example, as semiconductor devices become finer, there is a need for an analysis device having a resolution high enough to visualize crystal structure information of a sample having a very thin film thickness.

Conventionally, the crystal structure of such a sample has been analyzed through an electron backscatter diffraction (EBSD) method, a nano-beam electron diffraction (NED) method, and/or the like. In these cases, the EBSD method is a method of visualizing crystal structure information by analyzing a pattern of diffraction beams created by irradiating electron beams to a crystal sample in a scanning electron microscope (SEM), and the NED method is a method of visualizing crystal structure information by analyzing patterns of transmitted diffraction beams created by irradiating electron beams to a crystal sample in a transmission electron microscope (TEM).

However, the EBSD method and the NED method may only analyze samples of tens of nanometers (nm) (or greater), and therefore, samples having an ultrafine thin film thickness of 10 nm or less may not be analyzed. In addition, there is a problem in that it is difficult to distinguish between the same crystal grains with slightly different crystal orientations through the corresponding methods.

To overcome this problem, a method of analyzing the crystal structure of a sample through a four-dimensional scanning transmission electron microscope (4D-STEM) has been developed. In this case, the 4D-STEM utilizes convergent beam electron diffraction (CBED) data, which is a method of acquiring 4D diffraction experimental data having a corresponding relationship between a 2D sample image and a 2D CBED image since CBED patterns corresponding to respective pixels of the sample image to be analyzed is combined.

SUMMARY

A method of analyzing a crystal structure through four-dimensional scanning transmission electron microscope (4D-STEM) for determining a crystal structure of a sample by acquiring a position-averaged convergent beam electron diffraction (PACBED) pattern from CBED patterns respectively corresponding to dozens or more pixels, and then comparing a corresponding PACBED pattern with a PACBED pattern simulated for predicted candidate structures. However, the 4D-STEM method using CBED data as described above has a problem in that resolution is reduced because positional averaging for a specific region of the sample is inevitable.

In addition, the 4D-STEM method utilizing CBED data as described above involves using simulated PACBED data as a library to confirm that the simulated PACBED data matches an experimental PACBED pattern, so the experiment is performed only on a single grain with aligned crystal axes.

Accordingly, according to various embodiments of the present disclosure, provided are an apparatus for two-dimensional mapping of crystal information of a polycrystalline material including a plurality of crystal grains with high resolution and an operation method thereof.

The tasks to be achieved through embodiments of the present disclosure are not limited to the above-described tasks, and tasks not expressly mentioned may be clearly understood by those skilled in the art to which the embodiments belong from the present disclosure and the accompanying drawings.

Additional aspects will be set forth in part in the description which follows and, in part, will be apparent from the description, or may be learned by practice of the presented embodiments of the disclosure.

According to an aspect of an embodiment, a method for two-dimensional mapping of crystal information of a polycrystalline material may include acquiring a diffraction pattern by scanning an electron beam to the polycrystalline material, generating a plurality of clusters by applying a clustering algorithm to the acquired diffraction pattern based on unsupervised learning, acquiring the crystal information of the polycrystalline material by applying a parallel deep convolutional neural network (DCNN) algorithm to each of the plurality of generated clusters based on supervised learning, and generating a two-dimensional image in which the acquired crystal information is mapped.

According to an aspect of an embodiment, an apparatus for two-dimensional mapping of crystal information of a polycrystalline material includes an image acquisition unit configured to detect a captured image of a sample having the polycrystalline material by scanning an electron beam on the polycrystalline material; and an image processing unit configured to acquire a diffraction pattern acquired by the scanning of the electron beam on the polycrystalline material, generate a plurality of clusters by applying a clustering algorithm to the diffraction pattern acquired based on unsupervised learning, acquire the crystal information of the polycrystalline material by applying a parallel deep convolutional neural network (DCNN) algorithm to each of the plurality of generated clusters based on supervised learning, and generate a two-dimensional image in which the acquired crystal information is mapped.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
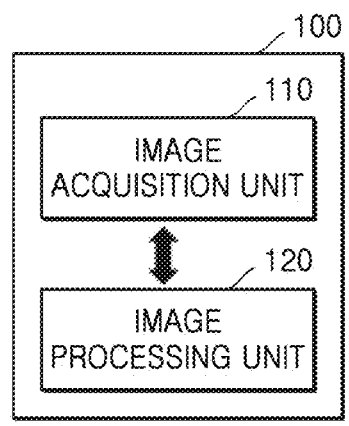
FIG. 1 is a block diagram illustrating an apparatus for two-dimensional mapping of crystal information of a polycrystalline material, according to at least one example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in these embodiments have chosen general terms that are widely available as possible, considering the functions in these embodiments, but this may vary depending on the understanding of technicians engaged in this technical field, legal cases, and/or the emergence of new technologies. In addition, in a specific case, there may be terms arbitrarily selected, and in this case, the meaning thereof will be described in detail in the description of the relevant embodiment. Therefore, the terms used in the embodiments should be defined based on the meaning of the terms and the overall descriptions of the embodiments, not the simple names of the terms.

In descriptions of embodiments, when a part is connected to another part, the part includes not only a case where the part is directly connected to another part, but also a case where the part is, e.g., electrically connected to another part with another component interposed therebetween. In addition, when a part includes a component, this means that it may further include other components, not excluding other components unless indicated otherwise.

The term "composed of", "comprising" or "including" used in the present embodiments should not be interpreted as necessarily including all of the various components or steps described in the present disclosure, and may not include some components or steps, or may further include additional components or steps.

In addition, terms including ordinal numbers, such as 'first' or 'second', used in the present disclosure may be used to describe and distinguish various components, but the components should not be limited thereto. The terms are used only to distinguish one component from another.

When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

In this disclosure, the functional blocks may, unless expressly indicated otherwise, denote elements that elements that process (and/or perform) at least one function or operation and may be included in and/or implemented as and/or in processing circuitry such hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), semiconductor elements in an integrated circuit, circuits enrolled as an intellectual property (IP), etc. For example, the image processing unit may include at least one general-purpose processor (such as a central processing unit (CPU) and/or an application processor (AP)) and/or a special-purpose processor (such as a neural processing unit (NPU), a neuromorphic processor, and/or a graphics processing unit (GPU)).

The description of the following example embodiments should not be construed as limiting the scope of rights, and it should be construed as belonging to the scope of rights of the embodiments that may be easily inferred by those skilled in the art. Hereinafter, embodiments for only example will be described in detail with reference to the accompanying drawings.

FIG. 1 is a block diagram illustrating an apparatus for two-dimensional mapping of crystal information of a polycrystalline material, according to at least one example embodiment;

Referring to FIG. 1, an apparatus 100 for two-dimensional mapping of crystal information of a polycrystalline material (hereinafter, referred to as a "mapping apparatus") may include an image acquisition unit 110 and an image processing unit 120. However, hardware components inside the mapping apparatus 100 are not limited to those illustrated in FIG. 1. For example, it may be understood by those skilled in the art associated with the present embodiment that a new configuration may be further added to the hardware configuration shown in FIG. 1.

In at least one embodiment, the image acquisition unit 110 may be an electron microscope. For example, the image acquisition unit 110 may be a four dimensional (4D) scanning transmission electron microscope (4D-STEM). In this case, the image acquisition unit 110 may include a condensing lens, a scanning coil, an annular dark field detector, and/or the like. A detailed structure of an example image acquisition unit 110 is described below with reference to FIG. 3.

The image acquisition unit 110 may detect (e.g., capture) a captured image of a sample having a crystal structure. In the present disclosure, the term "sample having a crystal structure" may refer to a sample of a polycrystalline material including a plurality of crystal grains as well as a crystalline material including a single crystal grain. In the present disclosure, the term "detect[ing] a captured image" may refer to generating an annular dark field (ADF) image for a sample detected through an electron microscope detector (e.g., an annular dark field detector). In at least one embodiment, the ADF image may include a diffraction pattern corresponding to 1:1 for each pixel. For example, the diffraction pattern may be a plurality of convergent beam electron diffraction (CBED) patterns formed by an electron beam incident on a sample of a polycrystalline material with a constant convergence angle.

In at least one embodiment, the image processing unit 120 may acquire and map crystal information of a sample by using a hybrid deep learning algorithm. The deep learning algorithm may be performed using, for example, a generative adversarial network (GAN), CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network and BNN (Bayesian Neural Network). Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests. For example, the image processing unit 120 may acquire and map crystal information of a sample by using a clustering algorithm corresponding to unsupervised learning and using a parallel deep convolutional neural network (DCNN) algorithm corresponding to supervised learning. The image processing unit 120 may include, and/or implemented as processing circuitry such hardware, software, or the combination of hardware and software.

The image processing unit 120 may generate a plurality of clusters by applying a clustering algorithm according to a predetermined (and/or otherwise determined) reference to a plurality of CBED patterns acquired through the image acquisition unit 110. In this case, the reference may refer to a region (e.g., crystal grain) of a crystal structure having a single direction, and thus, each of the plurality of clusters generated may include a CBED pattern for a single crystal grain.

The image processing unit 120 may acquire information (e.g., crystal symmetry, crystal tilt, crystal thickness, etc.) utilized in crystallographic analysis for a plurality of generated clusters by dispersing and processing the information in a separate DCNN algorithm. Through this, the image processing unit 120 may acquire crystal information, such as crystal symmetry, crystal tilt, and crystal thickness for each of the plurality of clusters.

For example, the DCNN algorithm may include a first DCNN algorithm associated with the crystal symmetry of a polycrystalline material, a second DCNN algorithm associated with the crystal tilt, and a third DCNN algorithm associated with the crystal thickness. Additionally, the DCNN algorithm may further include a fourth DCNN algorithm associated with strain of the crystal structure.

In some embodiments, in order to change data to be acquired through the DCNN algorithm and/or to improve (e.g., optimize) the performance and efficiency of the analysis algorithm, at least one of the number, combinations, adopted deep learning models, and/or associated hyperparameters may be changed.

In some example embodiments, the apparatus 100 may be applied in, e.g., semiconductor fabrication equipment. For example, the apparatus 100 may confirm that the crystal information of the polycrystalline material is within a manufacturing threshold. Based on this confirmation, the apparatus 100 may initiate additional manufacturing (e.g., repairing the polycrystalline material, fabricating additional layers on the polycrystalline material, patterning the polycrystalline material, etc.), and/or may pause the fabrication of the semiconductor until a source of the defect is rectified. However, the example embodiments are not limited thereto, and the apparatus 100 may be applied in, e.g., a research facilities studying, e.g., ultra-thin structures.

Figure 2:
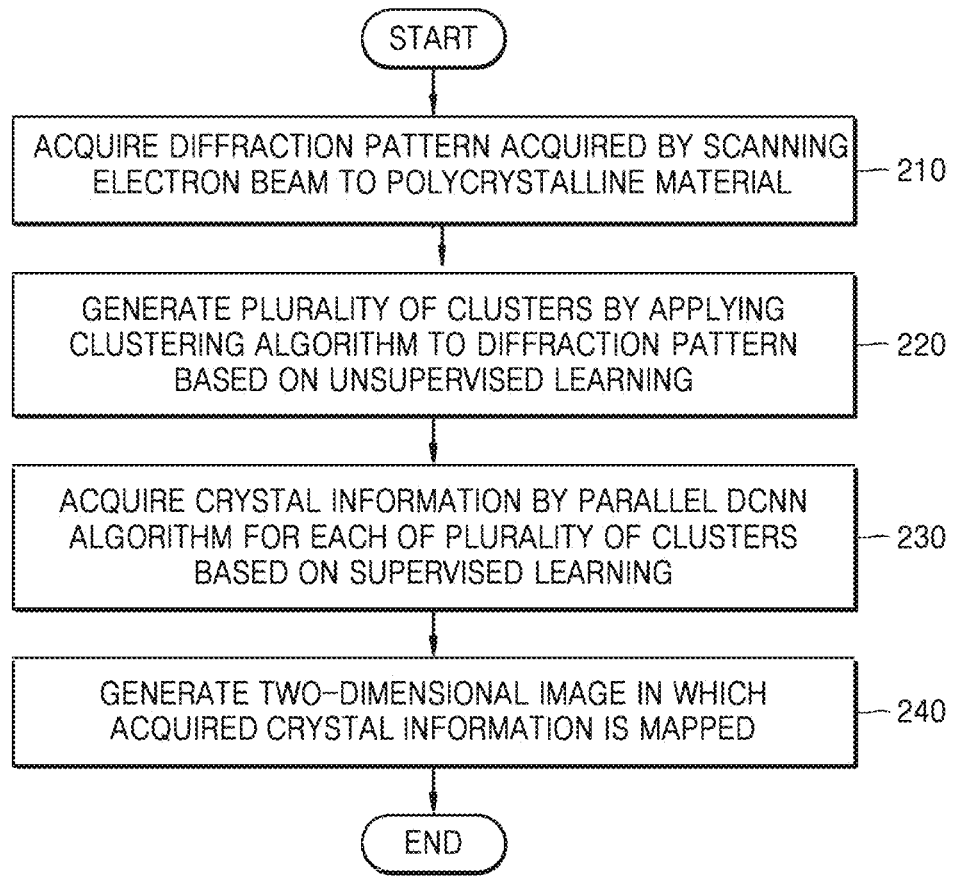
FIG. 2 is a flowchart illustrating a method for two-dimensional mapping of crystal information of a polycrystalline material according to at least one example embodiment.

FIG. 2 is a flowchart illustrating a method for two-dimensional mapping of crystal information of a polycrystalline material according to at least one example embodiment;

Referring to FIG. 2, an image processing unit (e.g., the image processing unit 120 of FIG. 1) of a mapping apparatus (e.g., the mapping apparatus 100 of FIG. 1) may acquire a diffraction pattern acquired by scanning an electron beam into a polycrystalline material in operation 210. In the present disclosure, the diffraction pattern may refer to a CBED dataset acquired from an ADF image of a polycrystalline material. In this case, the polycrystalline material may have an ultra-thin film thickness of about 10 nm or less. For example, the image processing unit 120 may acquire a CBED dataset for each pixel for a polycrystalline material having an ultra-thin film thickness of about 10 nm or less, and/or may have a spatial resolution of at least 2 $nm^2$.

In at least one embodiment, the image processing unit 120 may acquire the CBED dataset, which is (and/or includes) the diffraction pattern, through a 4D-STEM. When the focused electron beam of 4D-STEM scans a specific area of a sample, the image processing unit 120 may acquire a CBED pattern corresponding to each pixel from an annular dark field (ADF) image acquired by scanning the specific area. For example, the image processing unit 120 may acquire a CBED dataset including 36 CBED patterns from a specific region of the ADF images.

The image processing unit 120 may generate a plurality of clusters by applying a clustering algorithm to the diffraction pattern based on unsupervised learning in operation 220. In at least some examples, the clustering algorithm may refer to a neural network trained by unsupervised learning to generate clusters based on the properties of the polycrystalline material, e.g., crystal size, grain boundaries, crystal orientation, crystal type, etc. For example, the image processing unit 120 may generate a plurality of clusters by applying a clustering algorithm to a CBED dataset of a polycrystalline material. Unsupervised learning is a method of analyzing or extracting data characteristics of input data without label information, which may utilize an autoencoder (AE) structure.

The unsupervised learning in the present disclosure may correspond, for example, to a deep learning algorithm for extracting label information based on crystal grains for the acquired CBED dataset. For example, in at least one embodiment the image processing unit 120 may generate a plurality of clusters reflecting label information through a neural network including an input layer and a hidden layer (e.g., a clustering layer) of a dimension lower than that of an output layer by using the AE structure. In at least one example embodiment, the unsupervised learning may facilitate the preparation of input data for an application of, e.g., a parallel DCNN algorithm, as discussed in further detail below. A detailed description of an example of the clustering algorithm of unsupervised learning is described below with reference to FIG. 5.

In at least one embodiment, the image processing unit 120 may classify the acquired diffraction pattern based on crystal grains included in the polycrystalline material. For example, the image processing unit 120 may extract the number of optimal clusters that may be classified in the CBED dataset based on the clustering algorithm, and determine the number of extracted clusters as the number of grains included in the polycrystalline material. For example, in at least one embodiment, the number of multiple clusters generated by applying the clustering algorithm to the CBED dataset may be the same as the number of crystal grains included in the polycrystalline material.

In at least one embodiment, the clustering algorithm may be at least one of a K-means algorithm, a mean shift algorithm, a Gaussian mixture model (GCM) algorithm, a density-based spatial clustering of applications with noise (DBSCAN) algorithm, and/or the like. For example, the image processing unit 120 may apply the K-means algorithm to extract that the optimal number of clusters vector-quantified to the nearest mean in the CBED dataset is, e.g., six.

In one embodiment, the image processing unit 120 may generate a position averaged diffraction pattern for a diffraction pattern classified based on crystal grains included in the polycrystalline material. For example, when the diffraction pattern is a CBED dataset, the image processing unit 120 may generate a position average converted beam electron diffraction (PACBED) pattern on the CBED dataset.

When multiple CBED patterns (e.g., corresponding to each pixel of the sample image) are classified based on grains, the image processing unit 120 generates positioned averaged diffraction patterns (e.g., PACBED patterns) from the classified diffraction patterns (e.g., CBED datasets), to be compared with the simulated position averaged diffraction patterns (e.g., simulated PACBED patterns). In other words, since the "simulated position-averaged diffraction pattern", which is comparative data, is in the form of PACBED, the process of converting the "diffraction pattern", which is experimental data, into a PACBED form may be beneficial (and/or necessary).

In at least one embodiment, the image processing unit 120 may perform rotation correction on the PACBED pattern generated for the CBED datasets. For example, the image processing unit 120 may perform rotation correction on the PACBED pattern in a rotated state (e.g., to correspond to the direction of the simulated PACBED pattern).

The image processing unit 120 may acquire crystal information by applying a parallel DCNN algorithm to each of a plurality of clusters based on supervised learning in operation 230. The parallel DCNN algorithm may also be referred to as a parallel DCNN. Supervised learning is a method of analyzing or extracting data characteristics of input data with label information and may, e.g., utilize a DCNN structure by learning (or training) based on the input data with label information to generate prediction models.

The supervised learning in the present disclosure may, for example, correspond to a deep learning algorithm for generating a prediction model by mapping crystal information to a plurality of clusters in which the CBED dataset is classified based on crystal grains. For example, the image processing unit 120 may generate a prediction model in which crystal information is mapped to a specific cluster through a residual network (ResNet) for an input layer using a DCNN structure. A detailed description of an example of the DCNN algorithm of supervised learning is described below with reference to FIG. 7A.

In at least one embodiment, the parallel DCNN algorithm may include a plurality of DCNN algorithms classified according to a type of crystal information of a polycrystalline material. For example, the parallel DCNN algorithm may include a first DCNN algorithm associated with the crystal symmetry of a polycrystalline material, a second DCNN algorithm associated with the crystal tilt, and/or a third DCNN algorithm associated with the crystal thickness. In addition, the parallel DCNN algorithm may further include a fourth DCNN algorithm associated with a strain of the crystal structure.

The image processing unit 120 may generate a two-dimensional image in which the crystal information acquired in operation 230 is mapped in operation 240. For example, in an embodiment, when crystal information on a specific cluster is acquired through the parallel DCNN algorithm, the image processing unit 120 may generate a two-dimensional image to correspond to the ADF image detected through the image acquisition unit 110. For example, the two-dimensional image may include a first map image associated with crystal symmetry, a second map image associated with the crystal tilt, and a third map image associated with the crystal thickness.

Figure 3:
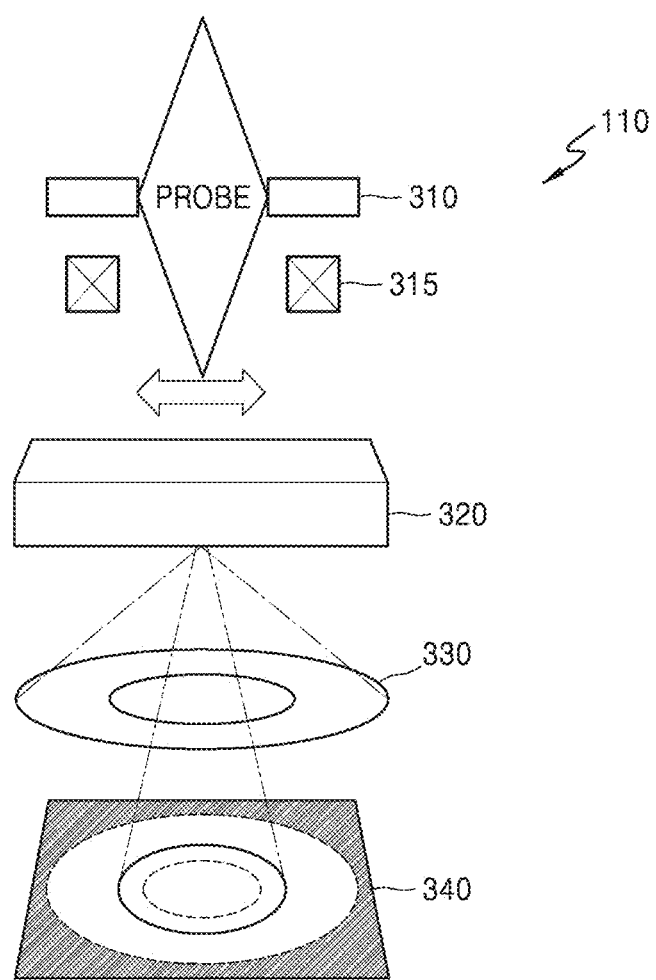
FIG. 3 illustrates a diagram of a 4D scanning transmission electron microscope (4D-STEM) apparatus that acquires a convergent beam electron diffraction (CBED) dataset according to at least one example embodiment.

FIG. 3 illustrates a diagram of a 4D-STEM apparatus that acquires a CBED dataset according to at least one example embodiment. In this case, the 4D-STEM apparatus may correspond to the image acquisition unit 110 of FIG. 1. However, the present embodiments are not limited thereto, and in another embodiment, it will be apparent to those skilled in the art that the image acquisition unit 110 of FIG. 1 may correspond to a detector of the 4D-STEM apparatus. However, for convenience of description, the "4D-STEM apparatus" will be described as an "image acquisition unit".

Referring to FIG. 3, the image acquisition unit 110 may include a condensing lens 310, a scanning coil 315, an ADF detector 330, and a CBED pattern detector 340.

In at least one embodiment, the image acquisition unit 110 may generate a probe in the form of an electron beam and generate a signal by scanning the generated probe onto the surface of a sample 320. In this case, the probe may correspond to each pixel of the captured image with respect to the sample acquired through the image acquisition unit 110. That is, since the probe may correspond to a basic unit of an electron beam scanned into the sample 320, the resolution of the probe may be different depending on the size (e.g., unit) of the probe.

In at least one embodiment, the image acquisition unit 110 may scan the probe while moving laterally across the upper surface of the sample 320. For example, the scan can move up (and/or down) and/or left (and/or right) with respect to the surface of the sample 320. For example, the image acquisition unit 110 may acquire an ADF image and a CBED dataset corresponding to the ADF image through the ADF detector 330 and the CBED pattern detector 340 by scanning the probe onto a specific area of the surface of the sample 320 while moving the probe up and down and/or left and right.

Figure 4:
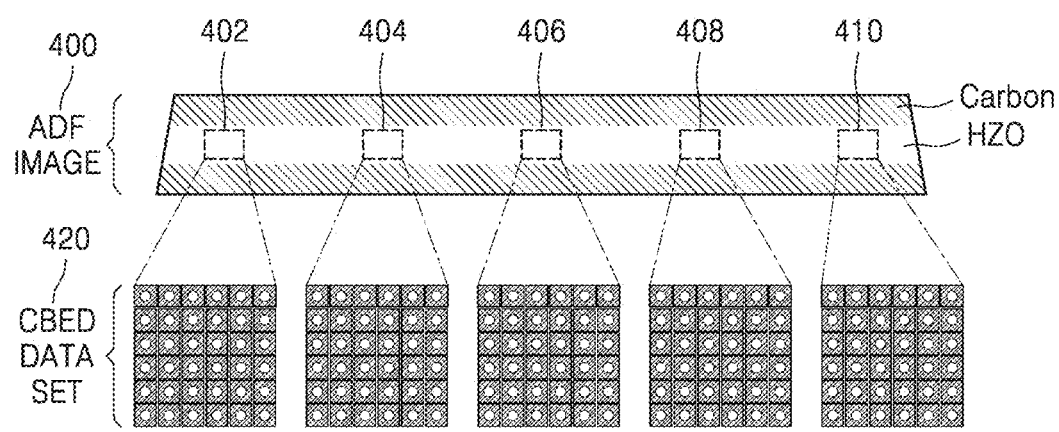
FIG. 4 is a diagram illustrating an example of a CBED dataset detected from an image acquisition unit according to at least one example embodiment.

FIG. 4 is a diagram illustrating an example of a CBED dataset detected from an image acquisition unit according to at least one embodiment.

Referring to FIG. 4, an ADF image 400 may correspond to an image acquired through an ADF detector (e.g., the ADF detector 330 of FIG. 3). For example, when the sample 320 having a crystal structure of a polycrystalline material is hafnium zirconium oxide (HZO), the ADF image 400 may include a carbon region and an HZO sample region distributed as a thin film having a thickness of about 10 nm. The carbon region may, for example, be transparent to the electron beam, but may permit the discharge of electrons (or other charge carriers), thereby preventing charge accumulation from forming on the surface of the sample.

In at least one embodiment, the image acquisition unit (e.g., the image acquisition unit 110 of FIG. 1) may acquire a CBED dataset 420 with respect to specific regions among samples 320 having a crystal structure of a polycrystalline material. For example, the image acquisition unit 110 may acquire CBED datasets for specific regions 402, 404, 406, 408, and 410 among portions corresponding to an HZO sample region in the ADF image 400. In this case, the CBED pattern included in the CBED dataset may be acquired to correspond to each pixel of the ADF image 400.

The image acquisition unit 110 may acquire a first CBED dataset of 6×6 arrays by scanning a probe having a predetermined (or otherwise determined) size with respect to a first region 402. The image acquisition unit 110 may acquire a second CBED dataset of 6×6 arrays by scanning a probe having a predetermined (or otherwise determined) size with respect to a second region 404. The image acquisition unit 110 may acquire a third CBED dataset of 6×6 arrays by scanning a probe having a predetermined (or otherwise determined) size with respect to a third region 406. The image acquisition unit 110 may acquire a fourth CBED dataset of 6×6 arrays by scanning a probe having a predetermined size with respect to a fourth region 408. The image acquisition unit 110 may acquire a fifth CBED dataset of 6×6 arrays by scanning a probe having a predetermined (or otherwise determined) size with respect to a fifth region 410. In this case, the first to fifth regions 402 to 410 in the ADF image 400 may be arranged at predetermined intervals. In other words, analysis efficiency may be improved by preventing overlapping of analytical data, as CBED datasets are acquired for a specific region and then CBED datasets are acquired for another specific region spaced apart from the specific region by a certain interval.

Figure 5:
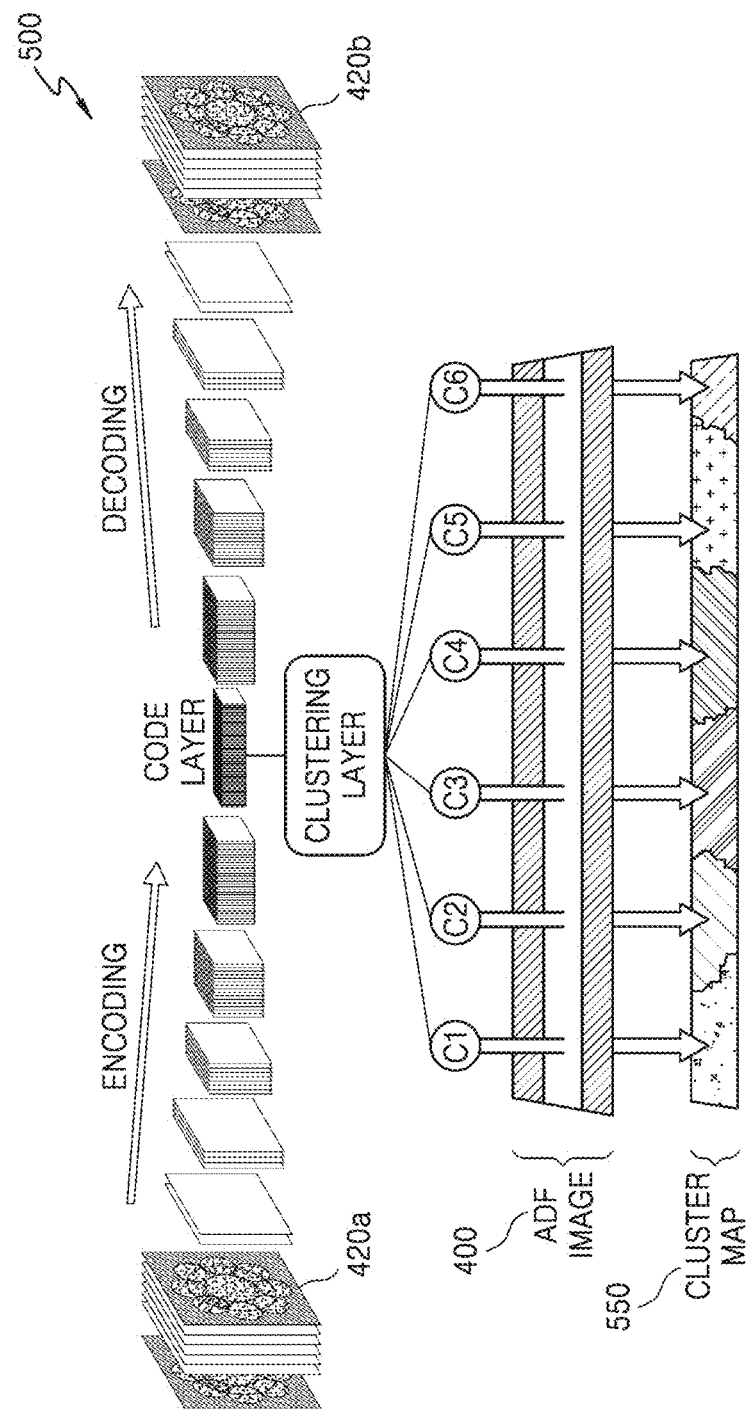
FIG. 5 is a diagram illustrating an example of a plurality of clusters acquired by applying a clustering algorithm to a CBED dataset according to at least one example embodiment.

FIG. 5 is a diagram illustrating an example of a plurality of clusters acquired by applying a clustering algorithm to a CBED dataset according to at least one embodiment.

Referring to FIG. 5, the image processing unit (e.g., the image processing unit 120 of FIG. 1) may classify data input through an input layer 420a into a plurality of clusters based on unsupervised learning.

In at least one embodiment, a clustering algorithm 500 is an algorithm that classifies data input through the input layer 420a into a plurality of clusters using an AE structure (or model). In at least one embodiment, in the clustering algorithm 500, a plurality of CBED datasets (e.g., the CBED dataset 420 of FIG. 4) acquired from the ADF image 400 for the sample may be input to the input layer 420a.

The clustering algorithm 500 may perform an encoding process of gradually decreasing a dimension for the input layer 420a, undergoing a code (and/or clustering) layer, which is a hidden layer, and performing a decoding process of gradually increasing a dimension to output an output layer 420b. In this case, the output layer 420b may include the same or similar data as the input layer 420a.

In at least one embodiment, a clustering layer may be added to the code layer in the clustering algorithm 500. In this case, computing code associated with classification and stratification may be inserted into the clustering layer in order to improve the precision of clustering. For example, computing code associated with classification and layering may include at least one of the K-means algorithm, the mean shift algorithm, the GMM algorithm, the DBSCAN algorithm, and/or the like.

In at least one embodiment, when the K-means algorithm is inserted into the clustering layer of the clustering algorithm 500, the image processing unit 120 may determine a K value. Thereafter, the image processing unit 120 may select K cluster centroids and allocate respective labels of a plurality of CBED patterns input through the input layer 420a as cluster labels corresponding to the nearest centroid. The image processing unit 120 may calculate an average of CBED patterns belonging to each cluster label to update K cluster centroids.

When there is no change in the value of the cluster centroid as the cluster label allocation operation and the cluster centroid update operation are iteratively performed as described above, the image processing unit 120 may generate a cluster map 550 based on the CBED patterns allocated to each cluster label.

For example, the image processing unit 120 may set, as 6, the number of improved or optimal clusters for the plurality of CBED patterns input through the input layer 420a. That is, the image processor 120 may set an arbitrary K value to 6. Afterwards, the image processing unit 120 may arbitrarily select the cluster centroid for the six cluster labels C1, C2, C3, C4, C5, and C6, and allocate each label of the input plurality of CBED patterns as a cluster label corresponding to the nearest centroid. The image processing unit 120 may calculate an average of the CBED patterns belonging to the six clusters to update the six cluster centroids. For example, the image processing unit 120 may repeatedly perform an operation of allocating a plurality of CBED patterns to six clusters and an operation of updating the cluster centroids, thereby generating a cluster map 550 corresponding to the ADF image 400, and divided into six clusters.

Figure 6:
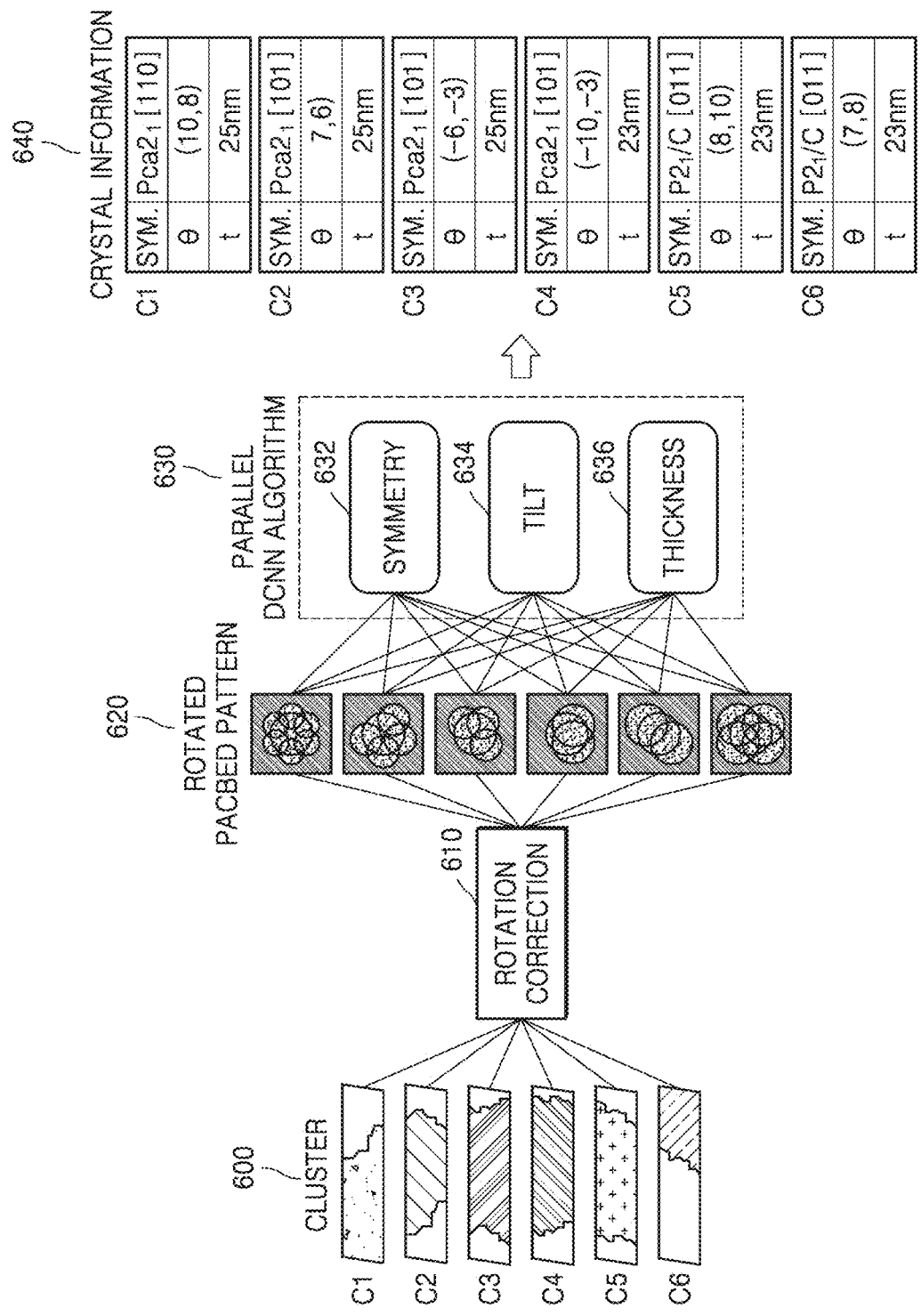
FIG. 6 is a diagram illustrating crystal information of a polycrystalline material, which is acquired by applying a parallel deep convolutional neural network (DCNN) algorithm to a plurality of clusters according to at least one example embodiment.

FIG. 6 is a diagram illustrating crystal information of a polycrystalline material, which is acquired by applying a parallel DCNN algorithm to a plurality of clusters according to at least one embodiment.

Referring to FIG. 6, an image processing unit (e.g., the image processing unit 120 of FIG. 1) may acquire crystal information on a plurality of clusters 600 based on supervised learning.

In at least one embodiment, the cluster map (e.g., the cluster map 550 of FIG. 5) acquired through the clustering algorithm (e.g., the clustering algorithm 500 of FIG. 5) may be divided into a plurality of cluster labels 600. In this case, a plurality of CBED patterns may be included in each of the plurality of cluster labels 600.

For example, the label of the first cluster C1 may include 640 CBED patterns classified into the first cluster C1 among a plurality of CBED datasets. The label of the second cluster C2 may include 467 CBED patterns classified into the second cluster C2 among the plurality of CBED datasets. The label of the third cluster C3 may include 482 CBED patterns classified into the third cluster C3 among the plurality of CBED datasets. The label of the fourth cluster C4 may include 631 CBED patterns classified into the fourth cluster C4 among the plurality of CBED datasets. The label of the fifth cluster C5 may include 458 CBED patterns classified into the fifth cluster C5 among the plurality of CBED datasets. The label of the sixth cluster C6 may include 247 CBED patterns classified into the sixth cluster C6 among the plurality of CBED datasets.

In at least one embodiment, the image processing unit 120 may perform position averaging on a plurality of CBED patterns included in the plurality of cluster labels 600 to acquire a PACBED pattern.

For example, the image processing unit 120 may acquire a first PACBED pattern by performing position averaging on 640 CBED patterns classified as labels of the first cluster C1. The image processor 120 may acquire a second PACBED pattern by performing position averaging on 467 CBED patterns classified as labels of the second cluster C2. The image processing unit 120 may acquire a third PACBED pattern by performing position averaging on 482 CBED patterns classified as labels of the third cluster C3. The image processor 120 may acquire a fourth PACBED pattern by performing position averaging on 631 CBED patterns classified as labels of the fourth cluster C4. The image processing unit 120 may acquire a fifth PACBED pattern by performing position averaging on 458 CBED patterns classified as labels of the fifth cluster C5. The image processing unit 120 may acquire a sixth PACBED pattern by performing position averaging on 247 CBED patterns classified by the sixth cluster C6 label.

In at least one embodiment, the image processing unit 120 may perform rotation correction 610 on the acquired PACBED pattern for each of the plurality of cluster labels 600. The PACBED pattern acquired for each of the plurality of cluster labels 600 may be arbitrarily rotated. In this case, since the acquired PACBED pattern may include crystal information mapped by comparing the acquired PACBED pattern with the simulated PACBED pattern, the image processing unit 120 may perform rotation correction 610 to correspond to the direction of the PACBED pattern simulated from the acquired PACBED pattern.

In at least one embodiment, the image processing unit 120 may acquire a plurality of rotated PACBED patterns 620 by performing rotation correction 610 on the acquired PACBED pattern. For example, since the first to sixth PACBED patterns may individually perform rotation correction 610, the plurality of rotated PACBED patterns 620 may include a rotated first PACBED pattern and/or a rotated sixth PACBED pattern.

In at least one embodiment, the image processing unit 120 may acquire crystal information 640 according to each algorithm by inputting a plurality of rotated PACBED patterns 620 in parallel to a parallel DCNN algorithm 630. For example, the parallel DCNN algorithm 630 may include a first DCNN algorithm 632, a second DCNN algorithm 634, and a third DCNN algorithm 636.

In at least one embodiment, the first DCNN algorithm 632 may be a model in which crystal information associated with crystal symmetry is learned. For example, the crystal information associated with the crystal symmetry may include a crystal phase and a crystal orientation. The crystal phase refers to a crystal structure according to bonding between atoms (e.g., a hafnium (Hf) atom and an oxygen (O) atom), and may include a monoclinic system, a tetragonal system, a cubic system, an orthorhombic system, and/or the like. The crystal orientation and/or type may be represented by a miller-index, point group, space group, and/or the like. For example, the crystal orientation may be represented by [110], [011], [101], and/or the like with one corner point of the unit lattice as an origin.

In at least one embodiment, when a plurality of rotated PACBED patterns 620 are input to the first DCNN algorithm 632, the image processing unit 120 may acquire information associated with the crystal symmetry from the first DCNN algorithm 632. For example, when the rotated first PACBED pattern is input to the first DCNN algorithm 632, the image processing unit 120 may acquire output data of "$Pca2_1$[110]", and based on this, the crystal phase of the first cluster C1 is orthorhombic, and the crystal orientation is [110]. In another example, when the rotated fifth PACBED pattern is input to the first DCNN algorithm 632, the image processing unit 120 may acquire output data of "$P2_1/C$[011]", and based on this, the crystal phase of the fifth cluster C5 is monoclinic and the crystal orientation is [011].

In at least one embodiment, the second DCNN algorithm 634 may be a model in which crystal information associated with the crystal tilt is learned (or trained). For example, the crystal information associated with the crystal tilt may mean the degree to which the direction of the crystal grains is distorted in the main crystal orientation.

In at least one embodiment, when a plurality of rotated PACBED patterns 620 are input to the second DCNN algorithm 634, the image processing unit 120 may acquire information associated with the crystal tilt from the second DCNN algorithm 634. For example, when the rotated first PACBED pattern is input to the second DCNN algorithm 634, the image processing unit 120 may acquire output data of (10, 8), and based on this, the grain of the first cluster C1 may have a tilt distorted by (10, 8) at [110] orientation. In another example, when the rotated fifth PACBED pattern is input to the second DCNN algorithm 634, the image processing unit 120 may acquire output data of (8, 10), and based on this, the grain of the fifth cluster C5 may have a tilt distorted by (8, 10) at [011] orientation.

In at least one embodiment, the third DCNN algorithm 636 may be a model in which crystal information associated with the crystal thickness is learned.

In an embodiment, when a plurality of rotated PACBED patterns 620 are input to the third DCNN algorithm 636, the image processing unit 120 may acquire information associated with the crystal thickness from the third DCNN algorithm 636. For example, when the rotated first PACBED pattern is input to the third DCNN algorithm 636, the image processing unit 120 may acquire output data of about 25 nm, and based on this, may acquire that the grains of the first cluster C1 have a thickness of about 25 nm. In another example, when the rotated fifth PACBED pattern is input to the third DCNN algorithm 636, the image processing unit 120 may acquire output data of about 23 nm, and based on this, may acquire that the grain of the fifth cluster C5 has a thickness of about 23 nm.

Figure 7A:
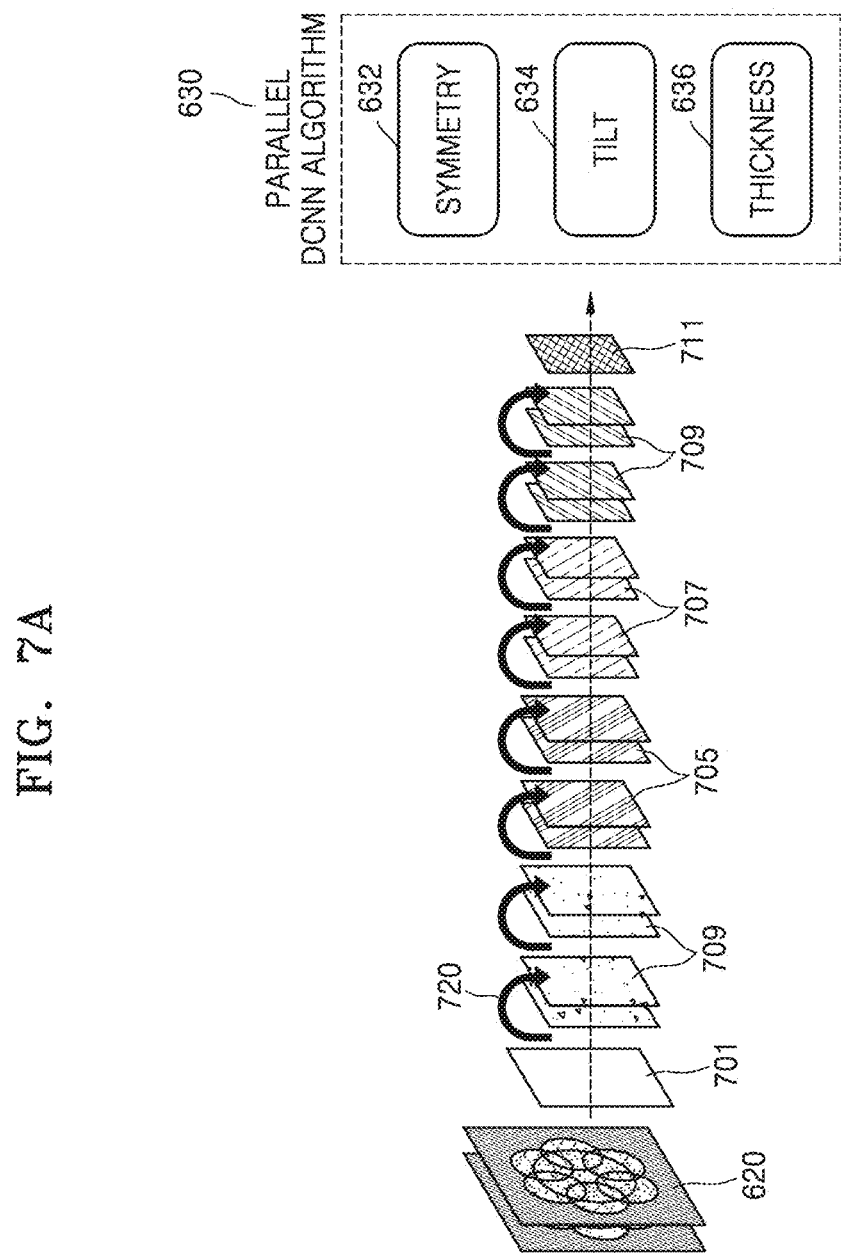
FIGS. 7A and 7B illustrate an example of a parallel DCNN algorithm architecture and examples of data included in a library according to at least one example embodiment, respectively.
Figure 7B:
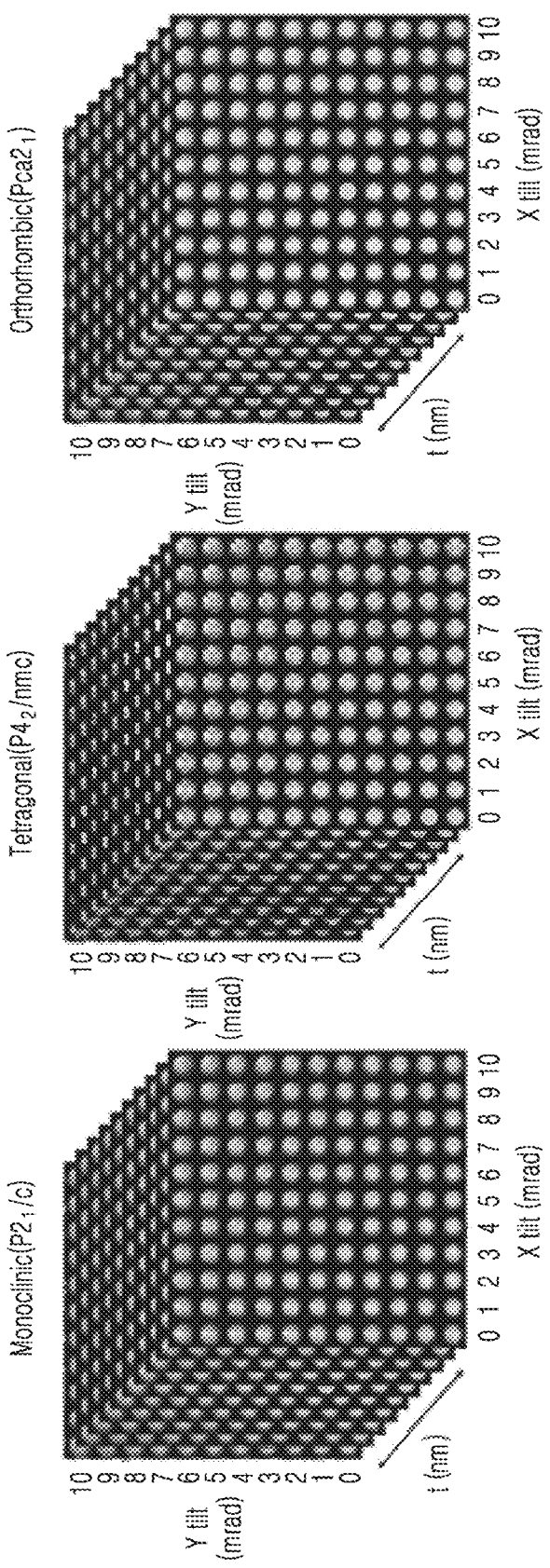

FIGS. 7A and 7B illustrate an example of a parallel DCNN algorithm architecture and examples of data included in a library according to at least one embodiment, respectively.

Referring to FIG. 7A, the image processing unit (e.g., the image processing unit 120 of FIG. 1) may acquire crystal information on a PACBED pattern input through the input layer 701 based on supervised learning.

In at least one embodiment, the parallel DCNN algorithm may include a first DCNN algorithm 632, a second DCNN algorithm 634, and a third DCNN algorithm 636, and may generate a prediction model through a ResNet for the input image 620. In this case, the input image 620 may mean a rotated PACBED pattern of the specific cluster Cn.

In at least one embodiment, when the DCNN algorithm generates a prediction model in the same structure as ResNet-18, the input layer 701 with respect to the input image 620 may have a size of "7×7 Conv64 filter".

In at least one embodiment, the DCNN algorithm may include blocks each comprising two layers in pairs. For example, the DCNN algorithm may include a first block 703, a second block 705, a third block 707, and a fourth block 709, each comprising two layers in pairs. In addition, shortcut connection layers 720 may be included between the input layer 701 and the first block 703, between blocks 703, 705, 707, and 709, and between the fourth block 709 and the output layer 711, respectively.

In this case, the layer included in the first block 703 may have a size of "3×3 Conv 64 filter", the layer included in the second block 705 may have a size of "3×3 Conv 128 filter", the layer included in the third block 707 may have a size of "3×3 Conv 256 filter", and the layer included in the fourth block 709 may have a size of "3×3 Conv 512 filter".

In at least one embodiment, the DCNN algorithm may output a fully connected layer as an output layer 711 for the input image 620. For example, the image processing unit 120 may acquire the input image 620 corresponding to the rotated PACBED pattern of the first cluster C1 based on the output layer 711 output through the DCNN algorithm, and may acquire crystal information on the grains of the first cluster C1 to be mapped thereto.

Referring to FIG. 7B, a library for the parallel DCNN algorithm 630 may include a plurality of simulated PACBED patterns. In this case, the plurality of simulated PACBED patterns may be patterns acquired through multi-slice simulation based on a crystal structure model.

In at least one embodiment, PACBED patterns may be primarily classified in the library for the parallel DCNN algorithm 630, based on information associated with the crystal phase. For example, the parallel DCNN algorithm 630 may primarily classify PACBED patterns into the monoclinic system, tetragonal system, and orthorhombic system.

Thereafter, PACBED patterns may be secondarily classified in the library for the parallel DCNN algorithm 630 based on information associated with the tilt and thickness of the crystal. For example, each of the crystal phases of the monoclinic system ($P2_1/c$), the tetragonal system ($P4_2/nmc$), and the tetragonal system ($Pca2_1$) may include a plurality of simulated PACBED patterns in which the X-axis and Y-axis tilts of the crystal correspond to about 0 to 10 mrad and the thickness of the crystal correspond to about 15 nm to 35 nm.

Figure 8:
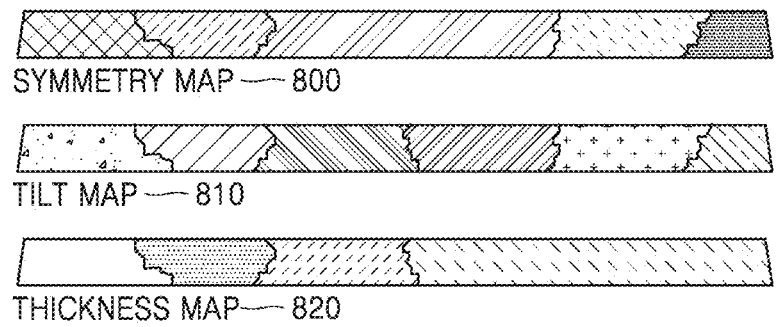
FIG. 8 illustrates examples of a two-dimensional image generated based on a hybrid mapping scheme according to at least one example embodiment.

FIG. 8 illustrates examples of a two-dimensional image generated based on a hybrid mapping scheme according to at least one embodiment.

Referring to FIG. 8, as a hybrid mapping scheme including unsupervised learning and supervised learning is performed, an image processing unit (e.g., the image processing unit 120 of FIG. 1) may finally generate a two-dimensional (2D) image. In this case, the 2D image may be generated to correspond to the ADF image 400 of FIG. 4.

In at least one embodiment, the image processing unit 120 may generate a map image associated with each crystal information from the crystal information (e.g., crystal information 640 of FIG. 6) acquired by applying a parallel DCNN algorithm. For example, the image processing unit 120 may generate a first map image 800 associated with the crystal symmetry of the first to sixth clusters C1 to C6. In another example, the image processing unit 120 may generate a second map image 810 associated with the crystal tilt of the first to sixth clusters C1 to C6. In another example, the image processing unit 120 may generate a third map image 820 associated with the crystal thickness of the first to sixth clusters C1 to C6.

Figure 9:
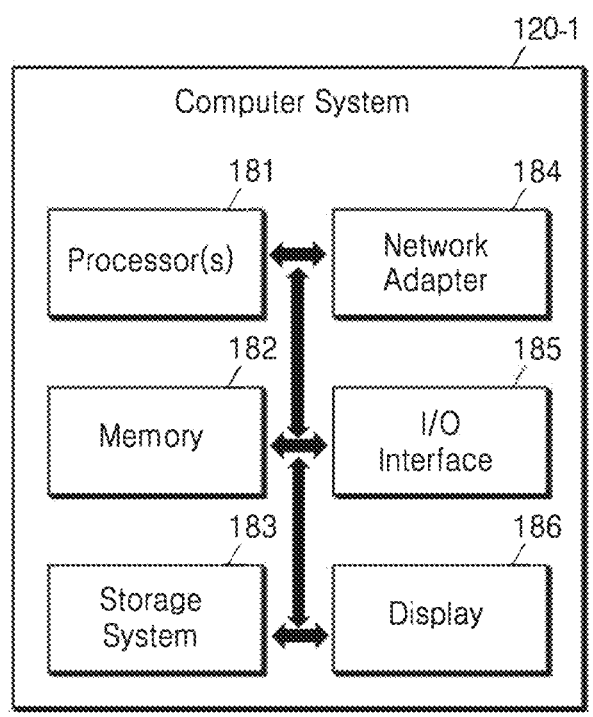
FIG. 9 is a block diagram of a computer system according to at least one embodiment.

FIG. 9 is a block diagram of the computer system 120-1 according to at least one embodiment. According to some embodiments, the computer system 120-1 of FIG. 9 may perform the two-dimensional mapping of crystal information of a polycrystalline material described above with reference to the drawings and may be (or include) an image processing unit (e.g., the image processing unit 120 of FIG. 1).

The computer system 120-1 may refer to a system including a general-purpose or special-purpose computing system. For example, the computer system 120-1 may include (and/or be included in) a personal computer (PC), a server computer, a laptop computer, an appliance product, and/or the like. Referring to FIG. 9, the computer system 120-1 may include at least one processor 181, a memory 182, a storage system 183, a network adapter 184, an input/output (I/O) interface 185, and a display 186.

The at least one processor 181 may execute a program module including an instruction executable by a computer system. The program module may include routines, programs, objects, components, a logic, and a data structure, which perform a certain operation or implement a certain abstract data format. The memory 182 may include a computer system-readable medium of a volatile memory type such as random-access memory (RAM). The at least one processor 181 may access the memory 182 and may execute instructions loaded into the memory 182. The storage system 183 may non-volatilely store information, and according to some embodiments, may include at least one program product including a program module configured to perform training of machine learning models for the layout simulation described above with reference to the drawings. Non-limiting examples of a program may include an operating system (OS), at least one application, other program modules, and other program data, and/or the storage system 183 may store the surrogate model which the at least one processor 181 accesses.

The network adapter 184 may provide an access to a local area network (LAN), a wide area network (WAN), and/or a common network (for example, the Internet). In at least one embodiment, the network adapter 184 may provide access to an image acquisition unit (e.g., the image acquisition unit 110 of FIG. 1). The I/O interface 185 may provide a communication channel for communication with a peripheral device such as a keyboard, a pointing device, and/or an audio system. The display 186 may output various pieces of information for a user to check. Though functional blocks are illustrated as separate, the embodiments of the computer system 120-1 are not limited thereto. For example, the computer system 120-1 may include more or fewer functional blocks, and/or the functional blocks may be integrated (e.g., the I/O interface 185 and the display 186).

According to some embodiments, the mapping of crystal information of a polycrystalline material, the generating a two-dimensional image, the unsupervised learning corresponding to the clustering algorithm, the supervised learning corresponding to the DCNN, and/or the like, as described above with reference to the drawings, may be implemented as a computer program product. The computer program product may include a non-transitory computer-readable medium (or a storage medium) including computer-readable program instructions for allowing the at least one processor 181 to perform image processing and/or training of models. Non-limiting examples of a computer-readable instruction may include an assembler instruction, an instruction set architecture (ISA) instruction, a machine instruction, a machine dependent instruction, a micro-code, a firmware instruction, state setting data, or a source code or object code written in at least one programming language.

The computer-readable medium may be, e.g., a type of medium for non-temporarily keeping and storing instructions executed by the at least one processor 181 or an arbitrary instruction-executable device. The computer-readable medium may be, but is not limited to, an electronic storage device, a magnetic storage device, an optical storage device, an electromagnetic storage device, a semiconductor storage device, or an arbitrary combination thereof. For example, the computer-readable medium may be a portable computer disk, a hard disk, RAM, read-only memory (ROM), electrically erasable read only memory (EEPROM), flash memory, static RAM (SRAM), a compact disk (CD), a digital video disk (DVD), a memory stick, a floppy disk, a mechanically encoded device such as a punch card, or an arbitrary combination thereof.

Figure 10:
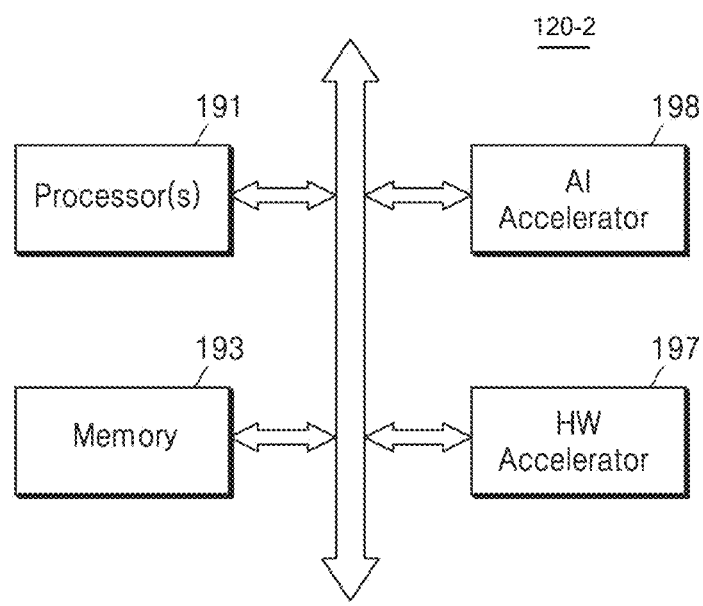
FIG. 10 is a block diagram of a system according to at least one embodiment.

FIG. 10 is a block diagram of a system 120-2 according to at least one embodiment. According to some embodiments, the computer system 120-2 of FIG. 10 may perform the two-dimensional mapping of crystal information of a polycrystalline material described above with reference to the drawings and may be (or include) an image processing unit (e.g., the image processing unit 120 of FIG. 1.

Referring to FIG. 10, the system 120-2 may include at least one processor 191, a memory 193, an artificial intelligence (AI) accelerator 195, and a hardware accelerator 197, and the at least one processor 191, the memory 193, the AI accelerator 195, and the hardware accelerator 197 may communicate with one another through a bus. According to some embodiments, the at least one processor 191, the memory 193, the AI accelerator 195, and/or the hardware accelerator 197 may be included in one semiconductor chip and/or processing circuitry. According to some embodiments, at least two of the at least one processor 191, the memory 193, the AI accelerator 195, and the hardware accelerator 197 may be included in each of two or more semiconductor chips mounted on a board.

The at least one processor 191 may execute instructions. For example, the at least one processor 191 may execute instructions stored in the memory 193 to execute an OS or applications executed on the OS. According to some embodiments, the at least one processor 191 may execute instructions to instruct the AI accelerator 195 and/or the hardware accelerator 197 to perform an operation, and to obtain a performance result of the operation from the AI accelerator 195 and/or the hardware accelerator 197. According to some embodiments, the at least one processor 191 may be an application specific instruction set processor (ASIP) customized for a certain purpose and may support a dedicated instruction set.

The memory 193 may have a structure which stores data. For example, the memory 193 may include a volatile memory device such as dynamic RAM (DRAM) or SRAM, and moreover, may include a non-volatile memory device such as flash memory or resistive RAM (RRAM). The at least one processor 191, the AI accelerator 195, and the hardware accelerator 197 may store data in the memory 193 through the bus and/or may read the data from the memory 193.

The AI accelerator 195 may refer to hardware designed for AI applications. According to some embodiments, the AI accelerator 195 may include a neural processing unit (NPU) for implementing a neuromorphic structure and may generate output data by processing input data provided from the at least one processor 191 and/or the hardware accelerator 197 and may provide the output data to the at least one processor 191 and/or the hardware accelerator 197. According to some embodiments, the AI accelerator 195 may be programmable and may be programmed by the at least one processor 191 and/or the hardware accelerator 197.

The hardware accelerator 197 may refer to, e.g., hardware designed to perform a certain operation at a high speed. For example, the hardware accelerator 197 may be designed to perform data conversion such as demodulation, modulation, encoding, or decoding at a high speed. The AI accelerator 197 may be programmable and may be programmed by the at least one processor 191 and/or the hardware accelerator 197.

According to some embodiments, the AI accelerator 195 may execute the mapping of crystal information of a polycrystalline material, the generating a two-dimensional image, the unsupervised learning corresponding to the clustering algorithm, the supervised learning corresponding to the DCNN, and/or the like described above with reference to the drawings. According to some embodiments, at least some of models executed by the AI accelerator 195 may be executed by the at least one processor 191 and/or the hardware accelerator 197.

It should be understood that the example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method for two-dimensional mapping of crystal information of a polycrystalline material, the method comprising:
  acquiring a diffraction pattern by scanning an electron beam to the polycrystalline material;
  generating a plurality of clusters by clustering the acquired diffraction pattern based on unsupervised learning;
  acquiring the crystal information of the polycrystalline material by distributing and processing the crystal information in a parallel deep convolutional neural network (DCNN) for each of the plurality of generated clusters based on supervised learning, wherein the crystal information includes a crystal symmetry, a crystal tilt and a crystal thickness, each acquired using the parallel DCNN; and
  generating a two-dimensional image in which the acquired crystal information is mapped.

2. The method of claim 1, wherein the generating of the plurality of clusters comprises:
  classifying the acquired diffraction pattern based on crystal grains contained in the polycrystalline material; and generating a positional averaged diffraction pattern for the classified diffraction pattern.

3. The method of claim 2, wherein the number of the plurality of generated clusters is the same as the number of the crystal grains included in the polycrystalline material.

4. The method of claim 2, wherein the generating of the plurality of clusters further comprising:
performing rotation correction on a direction of the generated positional average diffraction pattern to correspond to a direction of a simulated positional averaged diffraction pattern.

5. The method of claim 1, wherein the generating of the plurality of clusters comprises applying at least one of a K-means algorithm, a mean shift algorithm, a Gaussian mixture model (GMM) algorithm, or a density based spatial clustering of applications with noise (DBSCAN) algorithm with respect to the acquired diffraction pattern.

6. The method of claim 1, wherein the parallel DCNN applied to each of the plurality of clusters comprises
a first DCNN algorithm associated with the crystal symmetry of the polycrystalline material,
a second DCNN algorithm associated with the crystal tilt, and
a third DCNN algorithm associated with the crystal thickness.

7. The method of claim 6, wherein the parallel DCNN applied to each of the plurality of generated clusters further comprises a fourth DCNN algorithm associated with strain of a crystal structure.

8. The method of claim 1, wherein the two-dimensional image comprises a first map image associated with the crystal symmetry, a second map image associated with the crystal tilt, and a third map image associated with the crystal thickness.

9. The method of claim 1, wherein the polycrystalline material has an ultra-thin film thickness of about 10 nm or less.

10. The method of claim 1, wherein the acquired diffraction pattern comprises convergent beam electron diffraction (CBED) data acquired through 4D-scanning transmission electron microscope (4D-STEM).

11. An apparatus for two-dimensional mapping of crystal information of a polycrystalline material, the apparatus comprising:
an image acquisition unit configured to detect a captured image of a sample having the polycrystalline material by scanning an electron beam on the polycrystalline material; and
an image processing unit configured to
acquire a diffraction pattern acquired by the scanning of the electron beam on the polycrystalline material,
generate a plurality of clusters by clustering the diffraction pattern acquired based on unsupervised learning,
acquire the crystal information of the polycrystalline material by distributing and processing the crystal information in a parallel deep convolutional neural network (DCNN) for each of the plurality of generated clusters based on supervised learning, wherein the crystal information includes a crystal symmetry, a crystal tilt and a crystal thickness, each acquired using the parallel DCNN, and
generate a two-dimensional image in which the acquired crystal information is mapped.

12. The apparatus of claim 11, wherein the image processing unit is configured to classify the acquired diffraction pattern based on crystal grains included in the polycrystalline material and to generate a positional average diffraction pattern with respect to the classified diffraction pattern.

13. The apparatus of claim 12, wherein the number of the plurality of generated clusters is the same as the number of the crystal grains included in the polycrystalline material.

14. The apparatus of claim 12, wherein the image processing unit is configured to perform rotation correction on a direction of the generated positional average diffraction pattern to correspond to a direction of a simulated positional averaged diffraction pattern.

15. The apparatus of claim 11, wherein the image processing unit is configured to generate the plurality of clusters by applying at least one of a K-means algorithm, a mean shift algorithm, a Gaussian mixture model (GMM) algorithm, or a density based spatial clustering of applications with noise (DBSCAN) algorithm with respect to the acquired diffraction pattern.

16. The apparatus of claim 11, wherein the parallel DCNN applied to each of the plurality of clusters comprises
a first DCNN algorithm associated with the crystal symmetry of the polycrystalline material,
a second DCNN algorithm associated with the crystal tilt, and
a third DCNN algorithm associated with the crystal thickness.

17. The apparatus of claim 16, wherein the parallel DCNN applied to each of the plurality of generated clusters further comprises a fourth DCNN algorithm associated with strain of a crystal structure.

18. The apparatus of claim 11, wherein the two-dimensional image comprises a first map image associated with the crystal symmetry, a second map image associated with the crystal tilt, and a third map image associated with the crystal thickness.

19. The apparatus of claim 11, wherein the apparatus is configured to generate the two-dimensional image for the polycrystalline material which has an ultra-thin film thickness of about 10 nm or less.

20. The apparatus of claim 11, wherein
the image acquisition unit includes a 4D-scanning transmission electron microscope (4D-STEM), and
the acquired diffraction pattern comprises convergent beam electron diffraction (CBED) data acquired through the 4D-STEM.

* * * * *